Patented June 4, 1929.

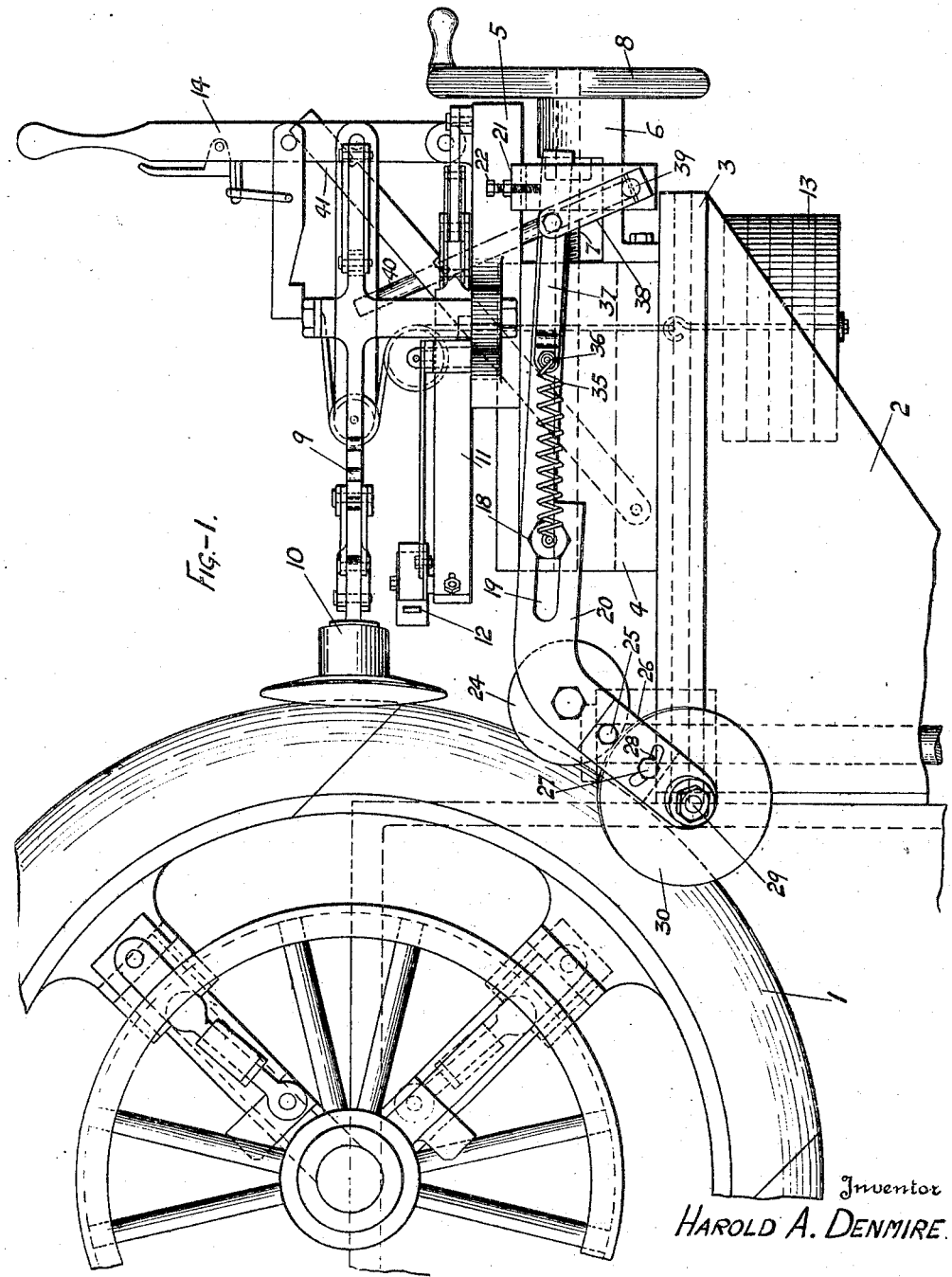

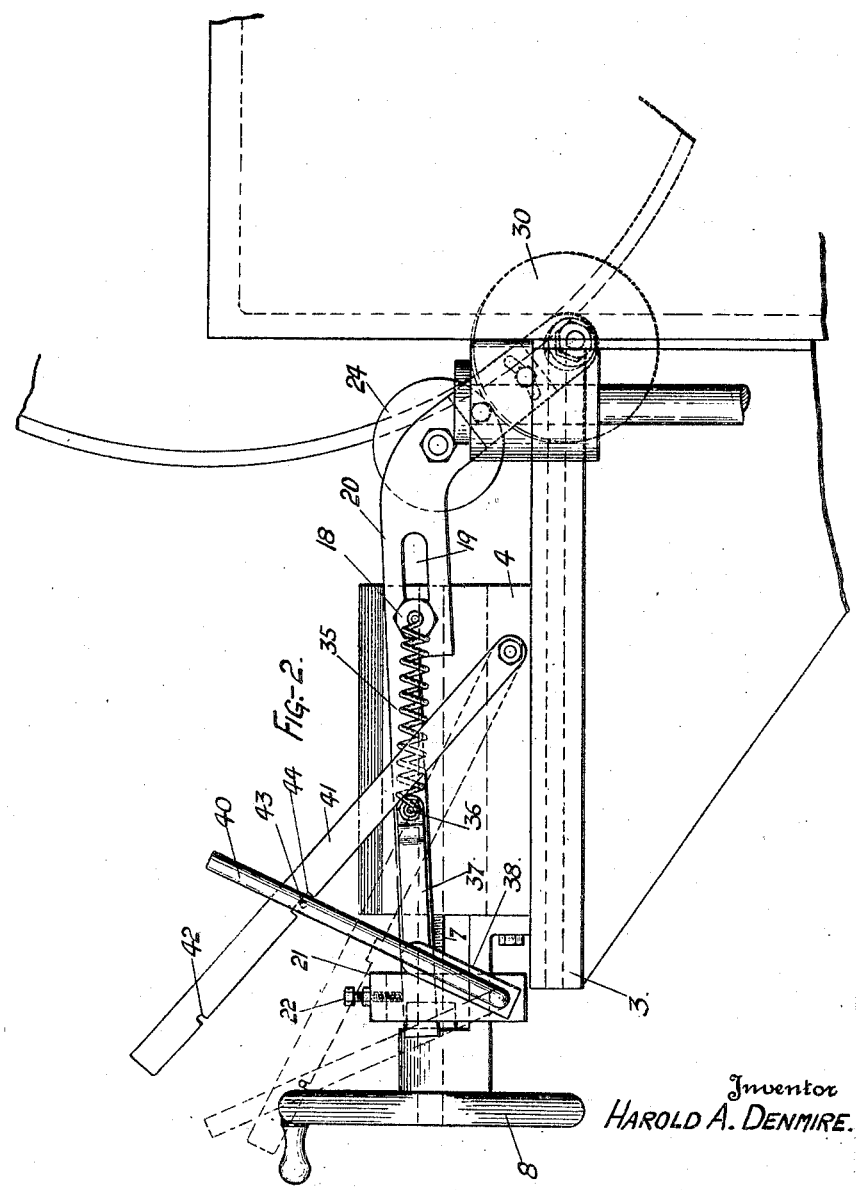

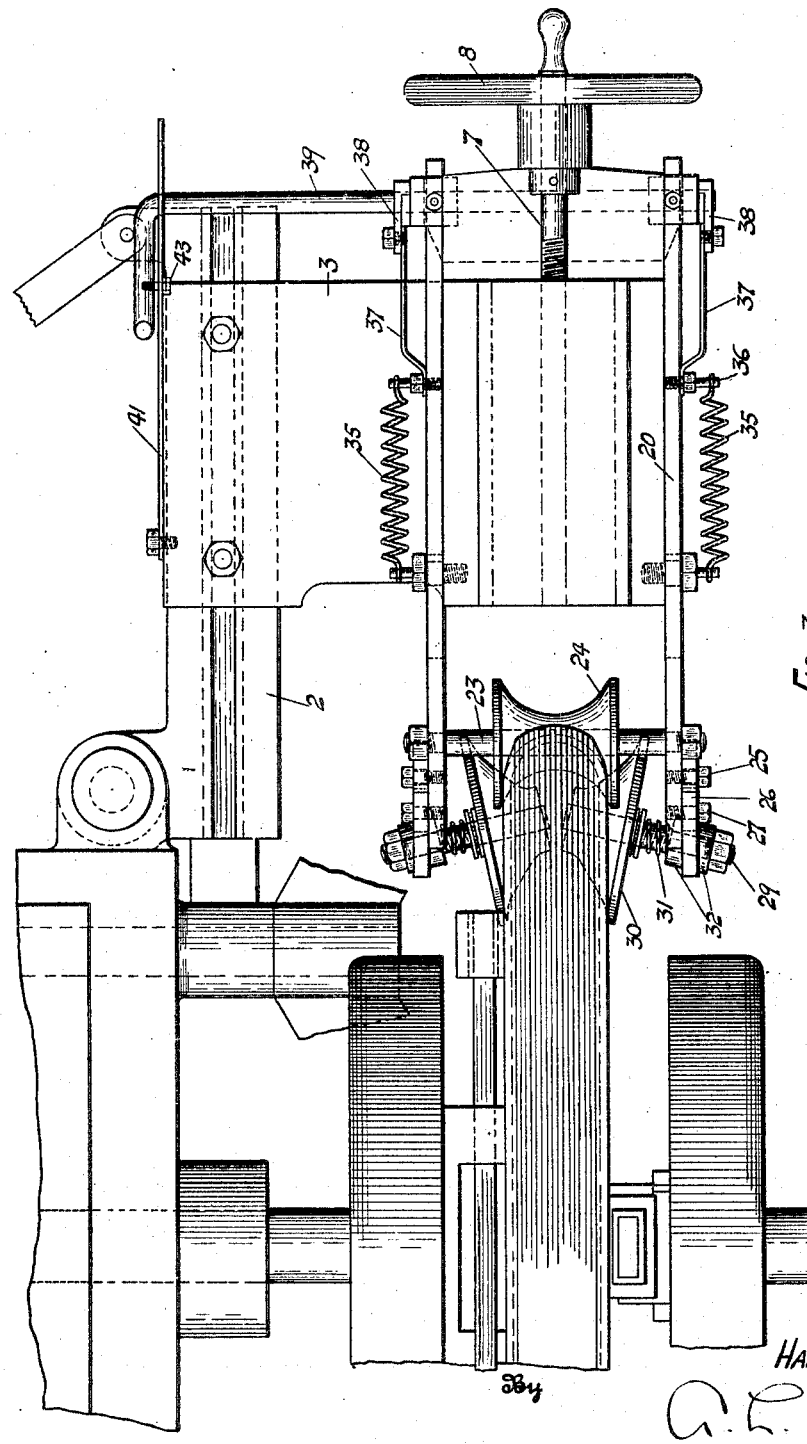

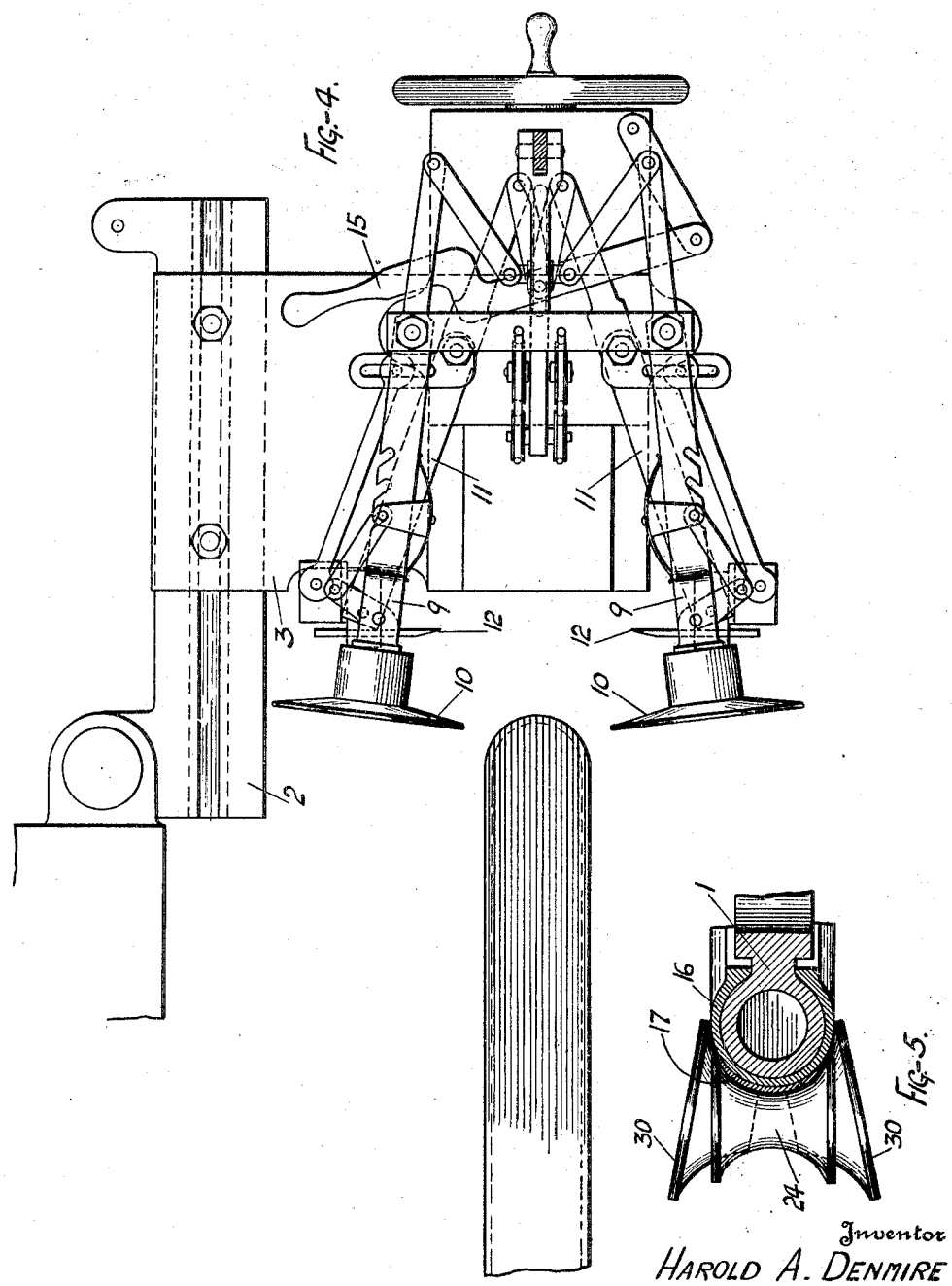

1,715,644

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

TIRE-MAKING MACHINE.

Application filed February 4, 1924. Serial No. 690,381.

This invention relates to tire making machinery and particularly to the provision in connection with the mechanism used for shaping the fabric about the core and trimming it, and further mechanism for shaping the rubber tread to the carcass. The object of the present invention is to devise machinery for applying the tread which will be capable of operation in conjunction with the remaining elements of the machine. The tread applying operation is automatic and can be performed with little attention on the part of the operator, it only requiring to be set to perform its functions.

It is a further object of the invention to devise a mechanism of this type which is adaptable for use in manufacturing various sizes of tires and to roll the tread accurately in position under all conditions. These and other objects will be apparent from the detailed showing and description of the invention, it being apparent that changes and modifications may be made within the scope of the invention and the appended claims.

In the drawings:

Figure 1 is a side elevation of the complete mechanism for shaping the fabric to the core, trimming the fabric and rolling the tread;

Figure 2 is a side elevation of the tread shaping roller taken in the opposite direction from Figure 1;

Figure 3 is a plan view of the tread mechanism;

Figure 4 is a plan view of the stitching mechanism;

Figure 5 is a detail showing the method of rolling the tread.

In the drawings, the rotatable core of the tire is illustrated at 1, being here shown as of the collapsible type in which the collapsing mechanism is a part of the core and permanently attached thereto, although the construction is optional and forming no part of the present invention is not shown or described in detail. At the side of the core is arranged a pivoted bracket 2 on which is adjustably mounted the plate 3 which supports the various shaping and trimming elements.

On the upper surface of the plate 3 is supported a block or base 4 on the upper portion of which is slidably mounted a carriage 5 movable toward and from the core. A bracket 6 attached to the rear of the base supports a screw shaft 7 which moves the carriage toward and from the core by threaded engagement therewith, the shaft being rotated by a hand wheel 8.

Upon the upper side of the carriage are supported the lateral rocking arms which carry the spinning rolls 10 and the laterally movable arms 11 which support the trimming knives 12. The details of the spinning roller supporting arms are not to be described here as they are fully described and claimed in my co-pending application Serial No. 361,161, filed February 25, 1920, Patent No. 1,617,705, Feb. 15, 1927, it being sufficient to state that the arms 9 are urged inward at all times by the suspended weight 13 and are controlled by a hand lever 14.

The details of the trimming mechanism will not be entered into here in detail as these elements are fully described and claimed in my copending application Serial No. 361,162, filed February 25, 1920, Patent No. 1,554,798, Sept. 22, 1925, it being sufficient to state that the arms 11 are moved to trimming position by the hand lever 15.

The spinning rollers and trimming knives are used at proper times to form and complete the tire casing, after which it is ready to receive the tread. In Figure 5, the core is indicated by the numeral 1, the carcass by the numeral 16 and the tread at 17. The mechanism which has been devised herein is mounted upon the plate which supports the other elements of the tire making machine, and it is so designed and arranged that the tread may be applied to the carcass by the operator while the core is rotating slowly, and as the core rotates the tread is brought around to the rolling mechanism and rolled in place, the action taking place automatically.

At the sides of the block 4 are located screw threaded guiding pins 18 which are received in slots 19 formed in parallel arms 20 which lie alongside of the blocks, the arms being received at their rear ends within stirrups 21 in the upper surface of which are adjustable pins 22 which bear upon the upper surfaces of the arms so that the angular position of the arms are determined. The arms are bent downwardly slightly at their forward ends and support a shaft 23 which carries a concave roller 24, the surface of which corresponds to and bears upon the central portion of the tread.

On the ends of the arms toward the core are pivoted, upon pins 25, two extensions 26, their adjustment relative to the arms being determined by set screws 27 which pass through arcs 28 in the extensions. Angularly positioned upon the extensions are pins 29 which support at their inner ends tapered rollers 30, yieldingly held at the ends of the pins by springs 31. The pins 29 converge toward the central line of the arms as shown in Figure 3, but their angular position may be adjusted by oblique faced washers 32 at either side of the extensions. In this manner the tapered rolls may be set so as to be properly adjusted relative to the tire, these rollers serving to smooth and apply the thin edge portions of the tread to the carcass. The action of these parts is clearly illustrated in Figure 5, it being understood that the roll 24 operates upon the center of the tread first and then the rolls 30 smooth out and apply the edge portions thereof.

The tread rollers are urged toward the tire by means of coil springs 35 located on either side of the block and attached to the pins 18 and to bolt 36 on the arms 20. The arms 20 are moved away from the core by links 37 which are attached to the arms 20 by pins 36 and at the other end to levers 38 carried upon a rocking arm 39 which is provided with an operating extension 40. When it is desired to remove the tread roller from the surface of the core, the arm 40 is drawn backwardly into the dotted line position shown in Figure 2, at which point the lever is held by a swinging link 41, a notch 42 in which engages a pin 43 on the lever. When in operating position, the pin 43 is engaged by an elongated notch 44 which permits the arms 20 to act under influence of the springs 35.

It will be observed that the operation of the device is extremely simple. After the carcass has been formed, the operator sticks one end of the tread to the core and starts the core in slow rotation. As the core reaches the roller 24, the central portion of the tread is rolled in place. It then encounters the two tapered rollers 30 which smoothly apply the thin edges of the tread to the carcass. After a single revolution the tread will be completely applied and the operator draws back the lever 40 and locks it out of position.

The pivoted adjustment of the extension of the arms 20 provides for the finishing of tires of different sizes and the angular adjustment of the tapered rolls adjusts the device for different profiles or types of treads, it being the purpose of tilting the rollers to obtain a wiping action therefrom. The tread rolling device is substantially automatic and once having been placed in position, the application of the tread requires no further attention on the part of the operator.

The fact that the tread rollers are carried upon the same support with the spinning rollers and also with the trimming knives is an improvement over other machines which have been designed for this purpose, as when the support is adjusted for the tire for spinning or trimming purposes, it is also adjusted for the tread application.

It is apparent that other embodiments of the invention may be devised which will accomplish the results desired without departing from the essential features as set forth in the appended claims.

As one of the changes which may be within the scope of the invention, weights or other power devices may be substituted for the springs 35, to urge the tread roller support toward the core.

What is claimed is:

1. In a tire making machine, a rotary core, a support at the side of the core, arms slidably mounted on the support, power means to move the arms toward the core, a locking device to hold the arms away from the core, a single tread roller in the ends of said arms adapted to roll the center of the tread, auxiliary rollers also carried on said arms to roll the edges of the tread, and means to adjust the angular relation of the auxiliary rollers with respect to the plane of the core.

2. In a tire making machine, a rotary core, a support at the side of the core, arms slidably mounted on the support, power means to move the arms toward the core, a locking device to hold the arms away from the core, a single tread roller in the ends of said arms, extensions on the arms adjustable relatively thereto, auxiliary rollers carried in said extensions adapted to roll the edges of the tread, and means to adjust the angular relation of the auxiliary rollers with respect to the plane of the core.

3. In a tire making machine, a rotary core, a support at the side of the core, arms upon said support movable toward and from the core, a tread roller in the ends of said arms, extensions on the arms adjustable relatively thereto, auxiliary rollers carried in said extensions adapted to roll the edges of the tread, and means to adjust the angular relation of the auxiliary rollers with respect to the plane of the core.

4. In a tire making machine, a rotary core, a support at the side of the core, arms upon said support movable toward and from the core, a concave tread roller in the ends of said arms, extensions on the arms adjustable relatively thereto, tapered rollers in said extensions, and means to adjust the angular relation of said tapered rollers to the plane of the core.

5. In a tire making machine, a rotary core, a support at the side of the core, arms upon said support movable toward and from the core, a concave tread roller carried by the arms, secondary tapered rollers also carried by the arms, and means to adjust the angular relation of the tapered rollers to the plane of the core.

6. In a tire making machine, a rotary core, a support at the side of the core, arms upon said support movable toward and from the core, a central tread roller upon the arms and auxiliary rollers for the edges of the tread, and means to adjust the position of the central tread roller and the auxiliary rollers and independent means for adjusting the angular relation of the auxiliary rollers with respect to the plane of the core.

7. In a tire making machine, a concave tread roller to smooth the crown of the tread and rollers at the sides of the said roller and in fixed relation thereto to roll the edges of the tread, and a single support for all of said rollers.

8. In a tire making machine, a concave tread roller operating upon the crown of the tread, rollers at the sides of said roller to operate upon the edges of the tread, and a single power actuated support adapted to press all of said rollers against the tire.

9. In a tire making machine, a concave tread roller bearing upon the central portion of the tread, and tapered rollers bearing upon the edges of the tread, the tapered rollers being mounted forwardly of the tread roller and angularly with respect to the plane of the tire to exert a wiping action upon the edges of the tread.

10. In a tire making machine, a central tread roller bearing upon the crown of the tire, and secondary rollers bearing upon the edges of the tread, the secondary rollers being located forwardly of the tread roller and angularly positioned with respect to the tire so as to obtain a wiping action upon the edges of the tread.

11. In a tire making machine, a central tread roller bearing upon the crown of the tire, said secondary rollers bearing upon the edges of the tread, the secondary rollers being located forwardly of the tread roller and angularly positioned with respect to the tire so as to obtain a wiping action upon the edges of the tread and being adjustable independently of the tread roller toward and from the axis of the tire.

12. In a tire making machine, a central tread roller bearing upon the crown of the tire, secondary rollers bearing upon the edges of the tread, the secondary rollers being located forwardly of the tread roller and angularly positioned with respect to the tire so as to obtain a wiping action upon the edges of the tread and being adjustable independently of the tread roller toward and from the axis of the tire, and pressure means to move said rollers against the tire.

13. In a tire making machine, a core, a support adjustable toward and from the core, fabric shaping mechanism, trimming mechanism, tread applying mechanism carried by and movable with said support into operative relation to the core, and independent control devices carried by the support to operate each of said mechanisms without further adjustment of the support.

14. In a tire making machine, a core, a support adjustable toward and from the core, fabric shaping mechanism and tread applying mechanism carried by and movable with said support into operative relation to the core, and independent control devices carried by the support to operate each of said mechanisms without further adjustment of the support.

HAROLD A. DENMIRE.